US012625763B2

(12) United States Patent
Pan et al.

(10) Patent No.: US 12,625,763 B2
(45) Date of Patent: May 12, 2026

(54) DATA ERROR CORRECTION METHOD AND APPARATUS, MEMORY CONTROLLER, AND SYSTEM

(71) Applicant: Huawei Technologies Co., Ltd., Shenzhen (CN)

(72) Inventors: Wei Pan, Shenzhen (CN); Junping Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 35 days.

(21) Appl. No.: 18/735,483

(22) Filed: Jun. 6, 2024

(65) Prior Publication Data

US 2024/0320087 A1     Sep. 26, 2024

Related U.S. Application Data

(63) Continuation of application No. PCT/CN2022/136779, filed on Dec. 6, 2022.

(30) Foreign Application Priority Data

Dec. 9, 2021     (CN) .......................... 202111498708.0

(51) Int. Cl.
*G06F 11/10*            (2006.01)
(52) U.S. Cl.
CPC .............................. *G06F 11/1004* (2013.01)
(58) Field of Classification Search
None
See application file for complete search history.

(56) References Cited

U.S. PATENT DOCUMENTS

| | | | | |
|---|---|---|---|---|
| 8,762,798 B2 * | 6/2014 | Hu | ........................ | H03M 13/13 714/704 |
| 11,150,814 B2 * | 10/2021 | Palmer | ................ | G06F 9/30029 |
| 2005/0144430 A1 * | 6/2005 | Yamamoto | .......... | G06F 11/1004 713/1 |
| 2006/0047872 A1 * | 3/2006 | Nakagawa | .......... | G06F 11/1076 710/100 |
| 2008/0282106 A1 * | 11/2008 | Shalvi | ................ | G06F 11/1068 714/E11.054 |
| 2010/0313102 A1 * | 12/2010 | Chen | ................... | G06F 12/0246 714/763 |

(Continued)

OTHER PUBLICATIONS

H. Kaneko, T. Matsuzaka and E. Fujiwara, "Three-Level Error Control Coding for Dependable Solid-State Drives," 2008 14th IEEE Pacific Rim International Symposium on Dependable Computing, Taipei, Taiwan, 2008, pp. 281-288, (Year: 2008).*

*Primary Examiner* — Daniel F. McMahon
(74) *Attorney, Agent, or Firm* — Conley Rose, P.C.

(57) ABSTRACT

When a memory controller reads target data in a memory, the memory controller reads the target data and first check code of the target data from the memory. The memory controller checks the target data using the first check code. If the check fails, it indicates that error data exists in the target data. The memory controller then performs error correction on the target data using the first check code. After failing to perform error correction on the target data using the first check code in the memory, the memory controller performs error correction on the target data using the second check code in the secondary storage.

20 Claims, 3 Drawing Sheets

(56)  References Cited

U.S. PATENT DOCUMENTS

| | | | |
|---|---|---|---|
| 2011/0185268 A1* | 7/2011 | Matsushige | G06F 11/0727 714/E11.024 |
| 2011/0239081 A1* | 9/2011 | Hida | H03M 13/2906 714/755 |
| 2012/0246387 A1* | 9/2012 | Kanno | G06F 11/1016 711/E12.008 |
| 2013/0104001 A1* | 4/2013 | Nakanishi | G06F 11/1048 714/E11.034 |
| 2015/0349805 A1* | 12/2015 | Tsai | H03M 13/2942 714/755 |
| 2016/0365874 A1* | 12/2016 | Nagashima | G06F 3/0641 |
| 2018/0336961 A1* | 11/2018 | Yang | G11C 29/42 |
| 2020/0119754 A1 | 4/2020 | Kim et al. | |
| 2021/0119646 A1* | 4/2021 | Montoye | H03M 13/095 |
| 2022/0269560 A1* | 8/2022 | Chung | H03M 13/1102 |
| 2023/0377673 A1* | 11/2023 | Jang | G11C 29/44 |

* cited by examiner

300

| 301 | 302 | 303 | 304 |
|---|---|---|---|
| Reading unit | Error correction unit | Obtaining unit | Writing unit |

400

401

Processing module

403

Interface

402

Storage

DATA ERROR CORRECTION METHOD AND APPARATUS, MEMORY CONTROLLER, AND SYSTEM

CROSS-REFERENCE TO RELATED APPLICATIONS

This is a continuation of International Patent Application No. PCT/CN2022/136779 filed on Dec. 6, 2022, which claims priority to Chinese Patent Application No. 202111498708.0 filed on Dec. 9, 2021. The disclosures of the aforementioned applications are hereby incorporated by reference in their entireties.

TECHNICAL FIELD

This application relates to the field of storage technologies, and in particular, to a data error correction method and apparatus, a memory controller, and a system.

BACKGROUND

A memory is configured to: temporarily store computing data of a processor in a computer, and data exchanged with an external storage such as a hard disk. A memory controller is located inside the computer, is connected to the processor and the memory in the computer, and is configured to manage the memory and be responsible for data exchange between the memory and the processor.

When the memory controller reads data under indication of the processor, in addition to reading the data from the memory, the memory controller further reads check code of the data from the memory, and checks the read data by using the check code to determine whether an error exists in the data. If an error exists in the read data, the memory controller may perform error correction on the read data by using the check code, and feeds back corrected data to the processor if the error correction succeeds.

From a perspective of data error correction, a larger amount of data of the check code indicates a stronger error correction capability of the check code, and error correction can be performed on a large amount of error data in the data. However, considering limited storage space of the memory, in actual application, the check code is not allowed to occupy much storage space.

Currently, the check code stored in the memory can usually be used to perform error correction on only single-bit error data existing in the data. When multi-bit error data exists in the data, an error correction effect cannot be achieved.

SUMMARY

This application provides a data error correction method and apparatus, a memory controller, and a system, to improve a data error correction capability in a memory.

According to a first aspect, an embodiment of this application provides a data error correction method, and the method may be performed by a memory controller. When the memory controller may need to read target data in the memory, the memory controller may read the target data and first check code of the target data from the memory. The memory controller may check the target data by using the first check code. If the check fails, it indicates that error data exists in the target data. The memory controller may perform error correction on the target data by using the first check code. After the memory controller fails to perform error correction on the target data by using the first check code, the memory controller may obtain second check code of the target data in a secondary storage. After the memory controller obtains the second check code, the memory controller performs error correction on the target data by using the second check code.

According to the foregoing method, after failing to perform error correction on the target data by using the first check code in the memory, the memory controller can further perform error correction on the target data by using the second check code in the secondary storage, to ensure that the error correction can be implemented on the target data, and improve a data error correction capability.

In a possible implementation, when performing error correction on the target data by using the second check code, the memory controller may perform error correction on the target data by using only the second check code, or may perform error correction on the target data by using the second check code and the first check code.

According to the foregoing method, after the error correction performed on the target data by using the first check code fails, the memory controller may flexibly perform error correction on the target data by using the second check code in different manners. This method is applicable to different scenarios.

In a possible implementation, after the memory controller may need to write the target data into the memory, and after obtaining the target data, the memory controller may generate the first check code and the second check code of the target data based on the target data. The memory controller may store the target data and the first check code in the memory, and the memory controller may store the second check code in the secondary storage.

According to the foregoing method, the first check code and the second check code that are generated based on the target data may be separately stored in different storages, to ensure that the check code does not occupy large memory space, and ensure the data error correction capability in the memory.

In a possible implementation, the secondary storage may be a memory other than the memory. For example, the secondary storage may be a non-volatile memory such as a storage-class memory (SCM), a solid-state drive (SSD), or a hard disk drive (HDD), or may be a volatile memory such as a random-access memory (RAM).

According to the foregoing method, specific forms of the secondary storage are diverse, and are applicable to different computing devices.

In a possible implementation, the first check code and the second check code may be two different components of one same piece of check code. That is, the first check code and the second check code are different. There may also be an inclusion relationship between the first check code and the second check code. For example, the second check code includes data that is the same as that in the first check code.

According to the foregoing method, the memory controller can flexibly configure the first check code and the second check code.

According to a second aspect, an embodiment of this application further provides a data error correction apparatus. The data error correction apparatus has a function of implementing behavior in the method instance of the first aspect. For beneficial effects, refer to the descriptions of the first aspect. Details are not described herein again. The functions may be implemented by hardware, or may be implemented by executing corresponding software by hardware. The hardware or software includes one or more units corresponding to the foregoing functions. In a possible design, a structure of the data error correction apparatus includes an error correction unit and a reading unit, and optionally, further includes an obtaining unit and a writing unit. These units may perform corresponding functions in the method example in the first aspect. For details, refer to the detailed descriptions in the method example. Details are not described herein again.

According to a third aspect, an embodiment of this application further provides a memory controller. The memory controller has a function of implementing behavior in the method instance of the first aspect. For beneficial effects, refer to the descriptions of the first aspect. Details are not described herein again.

In a possible implementation, a structure of the memory controller may include a processing module and a storage. The processing module is configured to support the memory controller in performing a corresponding function of the memory controller in the method according to the first aspect. The storage is coupled to the processing module, and stores program instructions and data that are necessary for the memory controller. The memory controller may further include an interface, configured to communicate with another component or apparatus, for example, receive an indication of a processor.

In another possible implementation, a structure of the memory controller may alternatively include a processing module and an interface. The memory controller is configured to support the memory controller in performing a corresponding function in the method according to the first aspect. The processor may further perform communication by using the interface, for example, receive an indication of the processor.

According to a fourth aspect, an embodiment of this application provides a data error correction system, and the system includes a memory controller, a memory, and a secondary storage. For beneficial effects, refer to the related descriptions of the first aspect. Details are not described herein again. In this system:

The memory is configured to store target data and first check code of the target data; the secondary storage is configured to store second check code of the target data; and the memory controller is configured to: read the target data and the first check code of the target data from the memory; after determining that error correction performed on the target data by using the first check code fails, read the second check code of the target data in the secondary storage; and perform error correction on the target data by using the second check code.

In a possible implementation, when performing error correction on the target data by using the second check code, the memory controller may perform error correction on the target data by using the second check code and the first check code, or may perform error correction on the target data by using only the second check code.

In a possible implementation, before writing the target data and the first check code into the memory, the memory controller may further first obtain the target data, and generate the first check code and the second check code of the target data based on the target data. After generating the first check code and the second check code, the memory controller may store the target data and the first check code in the memory, and store the second check code in the secondary storage.

When storing the second check code in the secondary storage, the memory controller may directly store the second check code in the secondary storage, or may store the second check code in the secondary storage by using another component.

For example, in this embodiment of this application, the data error correction system may further include a secondary controller. When storing the second check code in the secondary storage, the memory controller may indicate the secondary controller to store the second check code in the secondary storage. The secondary controller may store the second check code in the secondary storage under an indication of the memory controller.

In a possible implementation, the secondary storage includes a part or all of the following: an SCM, an SSD, an HDD, and a RAM.

In a possible implementation, the first check code and the second check code may be two different components of one same piece of check code. That is, the first check code and the second check code are different. There may also be an inclusion relationship between the first check code and the second check code. For example, the second check code includes data that is the same as that in the first check code.

According to a fifth aspect, this application further provides a computer-readable storage medium, and the computer-readable storage medium stores instructions. When the instructions are run on a computer, the computer is enabled to perform the method according to the first aspect and the possible implementations of the first aspect.

According to a sixth aspect, this application further provides a computer program product including instructions. When the computer program product runs on a computer, the computer is enabled to perform the method according to the first aspect and the possible implementations of the first aspect.

According to a seventh aspect, this application further provides a computer chip, where the chip is connected to a storage, and the chip is configured to read and execute a software program stored in the storage, to perform the method according to the first aspect and the possible implementations of the first aspect.

DESCRIPTION OF EMBODIMENTS

Figure 1:
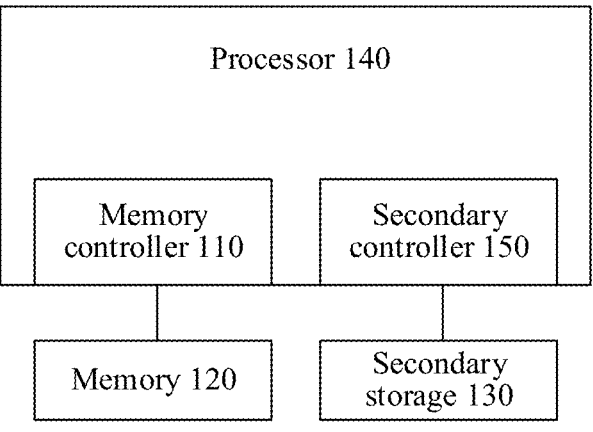
FIG. 1 is a schematic diagram of an architecture of a system according to an embodiment of this application.

FIG. 1 is a schematic diagram of a structure of a system according to an embodiment of this application. The system includes a memory controller 110, a memory 120, and a secondary storage 130. Optionally, the system may further include a processor 140 and a secondary controller 150.

The processor 140 may be connected to the memory controller 110. A manner of connecting the memory controller 110 to the processor 140 is not limited in this embodiment of this application. For example, the memory controller 110 may be built in the processor 140. For another example, the memory controller 110 may be connected to the processor 140 through a line.

The memory controller 110 is connected to the memory 120. The memory controller 110 can write data into the memory 120, and can also read data from the memory 120. In this embodiment of this application, the data may be target data, or may be first check code of target data.

The secondary controller 150 may be connected to the secondary storage 130, and is configured to manage the secondary storage 130. The secondary controller 150 may write data into the secondary storage 130, or read data from the secondary storage 130. In this embodiment of this application, the data may be second check code. A specific form of the secondary controller 150 is not limited in this embodiment of this application. The secondary controller 150 may be an independently deployed module, or may be a module built in the processor 140. In some scenarios, the secondary controller 150 may alternatively not be disposed, and instead, the processor 140 replaces the secondary controller 150 to manage the secondary storage 130. In this embodiment of this application, only that the secondary controller 150 is an independent module is used for description. A manner in which the processor 140 manages the secondary storage 130 is similar to a manner in which the secondary controller 150 manages the secondary storage 130. Details are not described herein again.

Functions of the memory controller 110 are mainly implemented in two processes: data writing and data reading.

(1) Data Writing Process

In this embodiment of this application, when writing data into the memory 120, the memory controller 110 may generate two types of check code of the data based on the data. For ease of distinguishing, the two types of check code are respectively referred to as first check code and second check code. The memory controller 110 may write one type of check code into the memory 120 together with the data, and the data and the check code may be stored at adjacent storage positions in the memory 120. In this embodiment of this application, the check code written into the memory 120 is referred to as the first check code. The memory controller 110 sends the other type of check code to the secondary storage 130. The secondary storage 130 stores the second check code in the secondary storage 130.

(2) Data Reading Process

In this embodiment of this application, when the memory controller 110 may need to read data from the memory 120, the memory controller 110 may further read the first check code from the memory 120. The memory controller 110 may check the read data by using the first check code. If the check fails, it indicates that error data exists in the read data, and the memory controller 110 may perform error correction on the read data by using the first check code. If the error correction fails, the memory controller 110 may notify the secondary controller 150 to read the second check code from the secondary storage 130, and perform error correction on the read data by using the second check code.

It can be learned from the foregoing two processes that the memory controller 110 generates two types of check code for data. The two types of check code do not need to be stored in the memory 120, but one type of check code is stored in the memory 120, and the other type of check code is stored in the secondary storage 130. In this way, storage space occupied by the check code in the memory 120 is not increased, and in addition, it can also be ensured that the check code in the secondary storage 130 can still be used to perform error correction on the data when error correction performed by using the check code in the memory 120 fails, to ensure a data error correction capability.

A specific form of the memory controller 110 is not limited in this embodiment of this application. For example, the memory controller 110 may include a digital signal processor 140 (DSP), an application-specific integrated circuit (ASIC), a field-programmable gate array (FPGA) or another programmable logic device, a discrete gate or a transistor logic device, a discrete hardware component, an artificial intelligence chip, or a chip on chip.

The memory 120 may include a volatile memory, for example, a RAM, or a dynamic random-access memory (DRAM). The memory 120 may alternatively include a non-volatile memory, for example, a SCM, or a combination of a volatile memory and a non-volatile memory.

The secondary storage 130 may be a memory other than the memory 120. For example, the secondary storage 130 may be a non-volatile memory with a large capacity, for example, a read-only memory (ROM), a flash memory, an SCM, an HDD, an SSD, or a disk enclosure that includes a plurality of hard disks. It is clear that, the secondary storage 130 may alternatively be a volatile memory.

Figure 2:
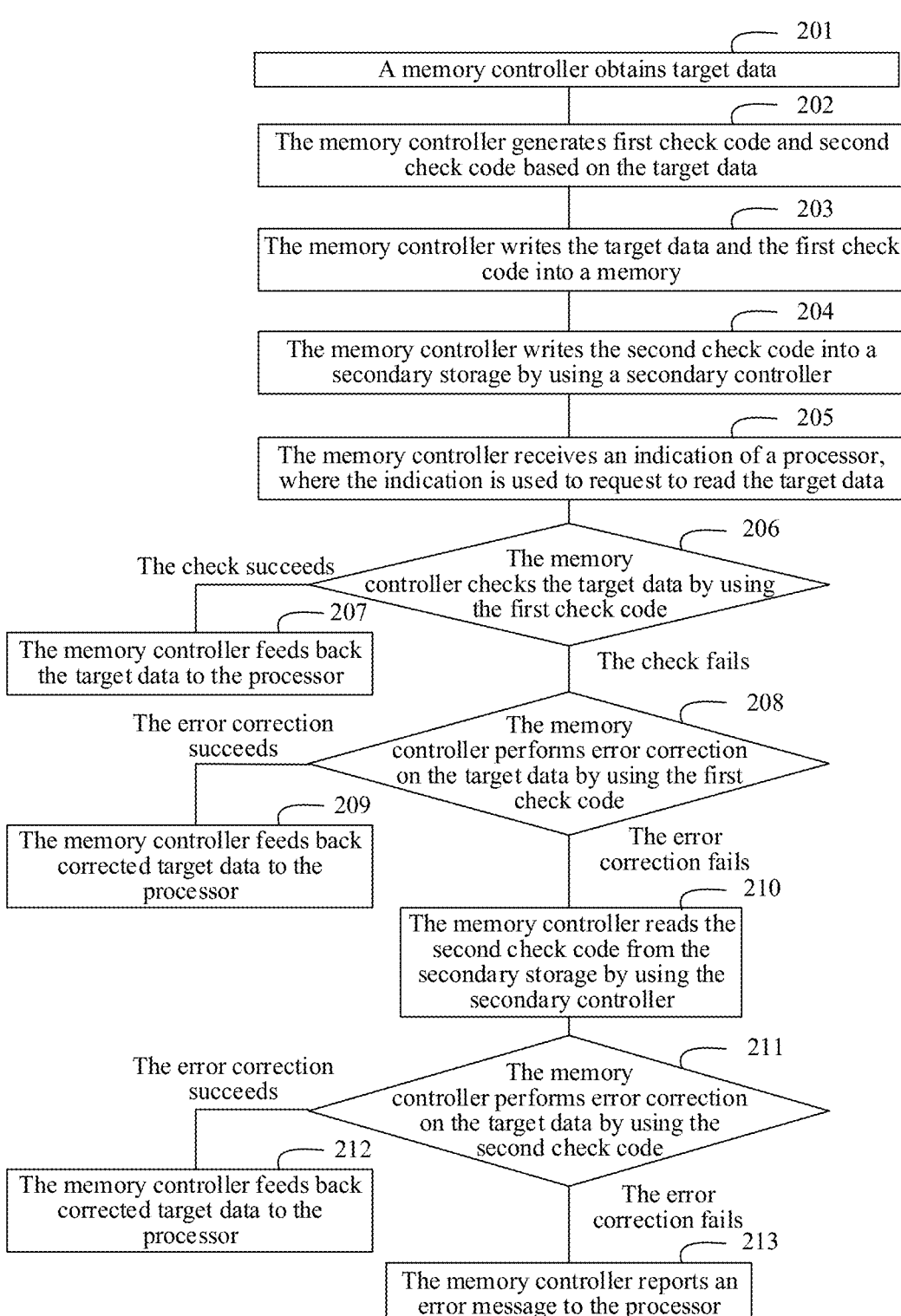
FIG. 2 is a schematic diagram of a data error correction method according to an embodiment of this application.

The following describes a data error correction method provided in an embodiment of this application with reference to FIG. 2. The data error correction method shown in FIG. 2 includes two procedures. One is a data writing procedure. For details, refer to step 201 to step 204. The other is a data reading procedure. For details, refer to step 205 to step 213.

Step 201: A memory controller 110 obtains target data.

When the target data may need to be stored in the memory, the memory controller 110 may obtain the target data. A manner in which the memory controller 110 obtains the target data is not limited in this embodiment of this application. For example, the memory controller 110 may obtain the target data from a processor, or may obtain the target data from another component (for example, a network adapter).

Step 202: The memory controller 110 generates first check code and second check code based on the target data.

A manner in which the memory controller 110 generates the first check code and the second check code is not limited in this embodiment of this application. The memory controller 110 may invoke an error checking and correction (ECC) algorithm to generate the first check code and the second check code of the target data.

When invoking the ECC algorithm, the memory controller 110 may generate check code A with a large data amount for the target data. The memory controller 110 may divide the generated check code A into two parts. One part is the first check code, and the other part is the second check code. Alternatively, the memory controller 110 may select a part of the generated check code A as the first check code, and use the entire check code A as the second check code. For example, the memory controller 110 may generate check code A of which data size is 16 bits for the target data. The memory controller 110 may select eight bits (where for example, first eight bits are selected) from the 16-bit check code A as the first check code, and use remaining eight bits (where for example, last eight bits are selected) as the second check code. Alternatively, the memory controller 110 may use eight bits of the 16-bit check code A as the first check code, and use the 16-bit check code A as the second check code.

After generating the first check code and the second check code, the memory controller 110 may store the first check code and the second check code.

Step 203: The memory controller 110 writes the target data and the first check code into a memory 120.

When writing the target data and the first check code into the memory 120, the memory controller 110 may write the target data and the first check code into adjacent storage positions in the memory 120.

Step 204: The memory controller 110 writes the second check code into a secondary storage 130 by using a secondary controller 150.

There is an association relationship among the target data, the first check code, and the second check code, so that the memory controller 110 can accurately read the second check code subsequently. The memory controller 110 may establish an association relationship between the first check code and the second check code.

When writing the first check code into the memory 120, the memory controller 110 records an address of the first check code in the memory 120. When performing step 204, the memory controller 110 may indicate the secondary controller 150 to write the second check code into the secondary storage 130 by using the address of the first check code. That is, the address of the first check code in the memory 120 is the same as an address of the second check code in the secondary storage 130. In this way, when the memory controller 110 may need to obtain the second check code, the memory controller 110 may initiate, to the secondary controller 150, an indication that carries the address of the first check code, and indicate the secondary controller 150 to read the second check code from the secondary storage 130 based on the address of the first check code.

Step 205: The memory controller 110 receives an indication of a processor 140, where the indication is used to request to read the target data. The memory controller 110 reads the target data and the first check code under the indication of the processor 140.

An example in which the processor 140 indicates the memory controller 110 to read the target data is merely used for description herein. In an actual application, the memory controller 110 may also periodically or when idle, perform check and error correction on data stored in the memory 120. In other words, the memory controller 110 may autonomously read the data in the memory 120. In this case, the memory controller 110 may autonomously read the target data and the first check code from the memory 120.

Step 206: The memory controller 110 checks the target data by using the first check code. If the check succeeds, step 207 is performed; or if the check fails, step 208 is performed.

The memory controller 110 may generate new check code B based on the target data. An algorithm used by the memory controller 110 to generate the check code B is the same as an algorithm used by the memory controller 110 to generate the check code A. Because used algorithms are the same, if the target data written by the memory controller 110 is different from the target data read by the memory controller 110, the check code A and the check code B are different. If the target data written by the memory controller 110 is the same as the target data read by the memory controller 110, the check code A and the check code B are the same.

The memory controller 110 compares the check code B with the first check code. If data at a target position in the check code B is consistent with the first check code, where the data at the target position herein means data that is in the check code and that is at a same position as the first check code in the check code A, it indicates that the target data written by the memory controller 110 is the same as the target data read by the memory controller 110, and the check succeeds. If the data at the target position in the check code B is inconsistent with the first check code, it indicates that the target data written by the memory controller 110 is different from the target data read by the memory controller 110, and the check fails.

Step 207: The memory controller 110 feeds back the target data to the processor 140.

Step 208: The memory controller 110 performs error correction on the target data by using the first check code. If the error correction succeeds, step 209 is performed. If the error correction fails, step 210 is performed.

When the memory controller 110 performs error correction on the target data by using the first check code, the memory controller 110 may perform an operation (for example, perform an XOR operation or an XNOR operation) on each bit in the target data by using the first check code, and determine a position of error data in the target data. When finding that the error data is single-bit data, the memory controller 110 may invert the single-bit data, to implement the error correction. When finding that the error data is multi-bit data, and when the error data occupies a large quantity of bits or a plurality of bits are distributed on different dies of the memory 120, the memory controller 110 cannot simply invert the multi-bit data to achieve an error correction effect, and step 210 may need to be performed.

Step 209: The memory controller 110 feeds back corrected target data to the processor 140.

If a scenario in which the memory controller 110 reads the target data is that the memory controller 110 autonomously performs check and error correction on the data stored in the memory 120, the memory controller 110 may rewrite the corrected target data into the memory 120.

Step 210: The memory controller 110 reads the second check code from the secondary storage 130 by using the secondary controller 150.

The memory controller 110 may initiate an indication to the secondary controller 150, to indicate the secondary controller 150 to read the second check code from a position indicated by the address of the first check code in the secondary storage 130.

Because the memory controller 110 may need to read the second check code from the secondary storage 130 by using the secondary controller 150, in comparison with the memory 120, the secondary storage 130 has a low read/write speed and a high latency. To enable the processor 140 to obtain a data access status in time, the memory controller 110 may send a notification message to the processor 140, where the notification message indicates that the processor 140 may need to wait.

Step 211: The memory controller 110 performs error correction on the target data by using the second check code. If the error correction succeeds, step 212 is performed. If the error correction fails, step 213 is performed.

After the memory controller 110 obtains the second check code, if the second check code is the entire check code A, the memory controller 110 may directly perform error correction on the target data by using the second check code, or if the second check code is a part of the check code A, the memory controller 110 may perform error correction on the target data by using the first check code and the second check code, where a manner of performing error correction on the target data by using the first check code and the second check code is similar to the manner of performing error correction on the target data by using the first check code. For details, refer to the foregoing content. Details are not described herein again.

Step 212: The memory controller 110 feeds back corrected target data to the processor 140.

If the scenario in which the memory controller 110 reads the target data is that the memory controller 110 autonomously performs check and error correction on the data stored in the memory 120, the memory controller 110 may rewrite the corrected target data into the memory 120.

Step 213: The memory controller 110 reports an error message to the processor 140, where the error message indicates the error data in the target data or a storage position of the error data.

The memory controller 110 performs error correction on the target data by using the second check code, but the error correction still fails. It indicates that there is a large amount of error data in the target data. This already exceeds an error correction capability of the second check code. The memory controller 110 may notify the processor 140 of the error data by using the error message, so that the processor 140 can restore the storage position at which the error data is located, and the processor 140 may restart or send an alarm to a user.

Figure 3:
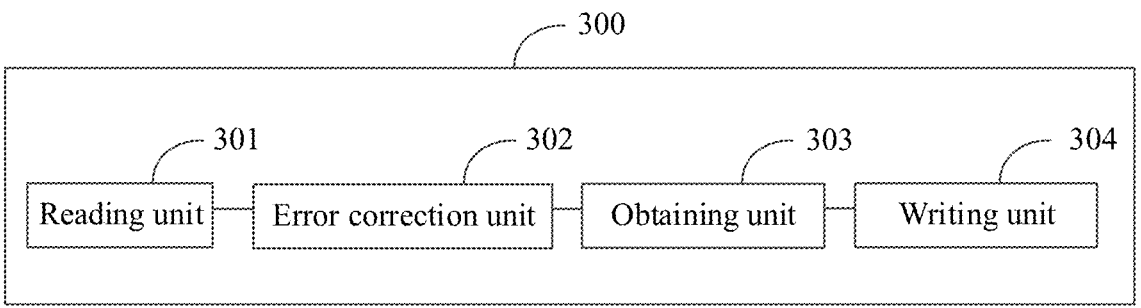
FIG. 3 is a schematic diagram of a structure of a data error correction apparatus according to an embodiment of this application.

Based on a same concept as that of the method embodiment, an embodiment of this application further provides a data error correction apparatus. The data error correction apparatus is configured to perform the method performed by the memory controller in the foregoing method embodiment shown in FIG. 2. For related features, refer to the foregoing method embodiment. Details are not described herein again. As shown in FIG. 3, a data error correction apparatus 300 may be deployed in a memory controller. The data error correction apparatus 300 includes a reading unit 301 and an error correction unit 302, and optionally, further includes an obtaining unit 303 and a writing unit 304.

The reading unit 301 is configured to read target data and first check code of the target data from a memory.

The error correction unit 302 is configured to perform error correction on the target data by using the first check code.

The reading unit 301 is further configured to: after determining that the error correction unit 302 fails to perform error correction on the target data by using the first check code, read second check code of the target data in a secondary storage.

The error correction unit 302 is further configured to perform error correction on the target data by using the second check code.

In a possible implementation, when performing error correction on the target data by using the second check code, the error correction unit 302 may perform error correction on the target data by using only the second check code, or may perform error correction on the target data by using the second check code and the first check code.

In a possible implementation, when the target data is written into the memory, the obtaining unit 303 may obtain the target data, and generate the first check code and the second check code of the target data based on the target data. Then, the writing unit 304 stores the target data and the first check code in the memory, and stores the second check code in the secondary storage.

In a possible implementation, the secondary storage may be a memory other than the memory. For example, the secondary storage may be a non-volatile memory such as an SCM, an SSD, or an HDD. The secondary storage may alternatively be a volatile memory, such as a RAM.

In a possible implementation, the first check code and the second check code are different.

In a possible implementation, the second check code includes data that is the same as that in the first check code.

It should be noted that, in embodiments of this application, the unit division is an example, and is merely logical function division. In actual implementation, another division manner may be used. In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

All or some of the foregoing embodiments may be implemented through software, hardware, firmware, or any other combination thereof. When software is used for implementation, all or some of the foregoing embodiments may be implemented in a form of a computer program product. The computer program product includes one or more computer instructions. When the computer program instructions are loaded or executed on a computer, all or some of the procedures or functions according to embodiments of the present disclosure are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium that can be accessed by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium. The semiconductor medium may be an SSD.

Figure 4:
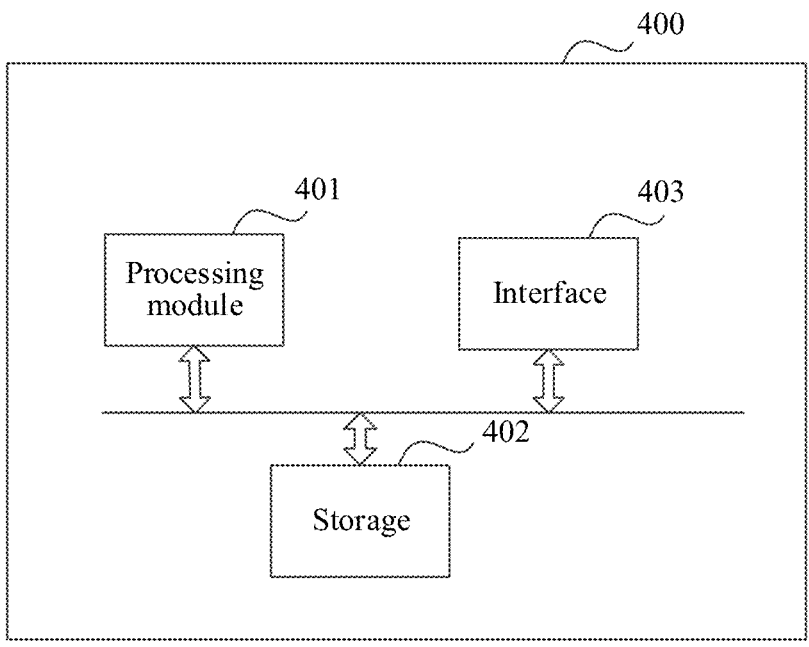
FIG. 4 is a schematic diagram of a structure of a memory controller according to an embodiment of this application.

In a simple embodiment, a person skilled in the art may figure out that the memory controller in the embodiment shown in FIG. 2 may be in a form shown in FIG. 4.

A memory controller 400 shown in FIG. 4 includes a processing module 401. Optionally, the memory controller 400 may further include a storage 402 and an interface 403.

The storage 402 may be a volatile memory, for example, a RAM. Alternatively, the storage may be a non-volatile memory, for example, a read-only memory, a flash memory, an HDD, or an SSD. Alternatively, the storage 402 is any other medium that can be used to carry or store expected program code in a form of instructions or a data structure and that can be accessed by a computer, but is not limited thereto. The storage 402 may be a combination of the foregoing storages.

The processing module 401 may be a general-purpose processor, a DSP, an ASIC, an FPGA or another programmable logic device, a discrete gate or a transistor logic device, a discrete hardware component, an artificial intelligence chip, a chip on chip, or the like. The general-purpose processor may be a microprocessor or the like.

When the memory controller 400 is in the form shown in FIG. 4, the processing module 401 in FIG. 4 may perform the method performed by the memory controller in any one of the foregoing method embodiments, or may invoke computer-executable instructions stored in the storage 402, to enable the memory controller to perform the method performed by the memory controller in any one of the foregoing method embodiments.

Specifically, functions/implementation processes of the reading unit 301, the error correction unit 302, the obtaining unit 303, and the writing unit 304 in FIG. 3 may all be implemented by the processing module 401 in FIG. 4.

A person skilled in the art should understand that embodiments of this application may be provided as a method, a system, or a computer program product. Therefore, this application may use a form of hardware-only embodiments, software-only embodiments, or embodiments with a combination of software and hardware. In addition, this application may use a form of a computer program product that is implemented on one or more computer-usable storage media (including but not limited to a disk memory, a compact disc read-only memory (CD-ROM), an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of processes and/or blocks in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may alternatively be loaded onto a computer or another programmable data processing device, so that a series of operations and steps are performed on the computer or the other programmable device, to generate computer-implemented processing. Therefore, the instructions executed on the computer or the other programmable device provide steps for implementing a specified function in one or more processes in the flowcharts and/or in one or more blocks in the block diagrams.

It is clear that a person skilled in the art can make various modifications and variations to this application without departing from the scope of this application. Therefore, this application is intended to cover these modifications and variations of this application provided that they fall within the scope of the claims of this application and their equivalent technologies.

What is claimed is:

1. A method applied to a memory controller, wherein the method comprises:

obtaining target data;

generating a first check code based on the target data and a second check code based on the target data;

storing the target data and the first check code in a memory;

storing the second check code in a secondary storage;

reading, from the memory, the target data and the first check code;

performing error correction on the target data using the first check code;

reading, after error correction performed on the target data using the first check code fails, the second check code from the secondary storage; and performing, using the second check code, error correction on the target data.

2. The method of claim 1, wherein performing, using the second check code, the error correction on the target data comprises performing error correction on the target data using the second check code and the first check code.

3. The method of claim 2, wherein the first check code and the second check code are different.

4. The method of claim 1, wherein the secondary storage comprises a part or all of a storage class memory (SCM), a solid-state drive (SSD), a hard disk drive (HDD), or a random-access memory.

5. The method of claim 1, wherein the first check code comprises first data and the second check code comprises the first data.

6. The method of claim 1, further comprising reporting, to a processor after error correction performed on the target data using the second check code fails, an error message indicating at least one of error data in the target data or a storage position of the error data.

7. A computer program product comprising instructions that are stored on a computer-readable medium and that, when executed by a processor, cause an apparatus to:

obtain target data;

generate a first check code based on the target data and a second check code based on the target data;

store the target data and the first check code in a memory;

store the second check code in a secondary storage;

read, from the memory, the target data and the first check code;

perform error correction on the target data using the first check code;

read, after error correction performed on the target data using the first check code fails, the second check code from the secondary storage; and perform, using the second check code, error correction on the target data.

8. The computer program product of claim 7, wherein the instructions, when executed by the processor, further cause the apparatus to perform error correction on the target data using the second check code and the first check code.

9. The computer program product of claim 8, wherein the first check code and the second check code are different.

10. The computer program product of claim 7, wherein the secondary storage comprises a part or all of a storage class memory (SCM), a solid-state drive (SSD), a hard disk drive (HDD), or a random-access memory.

11. The computer program product of claim 7, wherein the first check code comprises first data and the second check code comprises the first data.

12. A system comprising:

a memory configured to store target data and first check code of the target data;

a secondary storage configured to store second check code of the target data;

a secondary controller; and a memory controller coupled to the memory, the secondary controller, and the secondary storage, wherein the memory controller is configured to:

obtain the target data;

generate the first check code based on the target data and the second check code based on the target data;

store the target data and the first check code in the memory;

provide an instruction to the secondary controller to store the second check code in the secondary storage;

read, from the memory, the target data and the first check code of the target data;

perform error correction on the target data using the first check code;

read, after error correction performed on the target data using the first check code fails, the second check code of the target data from the secondary storage; and perform, using the second check code, error correction on the target data, and wherein the secondary controller configured to store, based on the instruction of the memory controller, the second check code in the secondary storage.

13. The system of claim 12, wherein when performing error correction on the target data using the second check code, the memory controller is further configured to perform error correction on the target data using the second check code and the first check code.

14. The system of claim 13, wherein the first check code and the second check code are different.

15. The system of claim 12, wherein the secondary storage comprises a part or all of a storage class memory (SCM), a solid-state drive (SSD), a hard disk drive (HDD), or a random-access memory.

16. The system of claim 12, wherein the first check code comprises first data and the second check code comprises the first data.

17. The system of claim 12, wherein the memory controller is further configured to report, to a processor after error correction performed on the target data using the second check code fails, an error message indicating at least one of error data in the target data or a storage position of the error data.

18. The system of claim 12, wherein the memory controller is further configured to feed back, to a processor after error correction performed on the target data using the second check code succeeds, corrected target data.

19. The method of claim 1, further comprising feeding back, to a processor after error correction performed on the target data using the second check code succeeds, corrected target data.

20. The computer program product of claim 7, wherein the instructions, when executed by the processor, further cause the apparatus to:

report, after error correction performed on the target data using the second check code fails, an error message indicating at least one of error data in the target data or a storage position of the error data; and feed back, after error correction performed on the target data using the second check code succeeds, corrected target data.

* * * * *